United States Patent Office 3,655,874
Patented Apr. 11, 1972

3,655,874
PROCESS FOR THE PURIFICATION OF CRUDE GONADOTROPIN PREPARATIONS
Hans van Hell, Titus Brandsmasingel 37, Oss, Netherlands
No Drawing. Continuation-in-part of application Ser. No. 513,588, Dec. 13, 1965. This application Apr. 28, 1969, Ser. No. 819,971
Claims priority, application Netherlands, Jan. 13, 1965, 6500350
Int. Cl. A61k *17/00, 17/06*
U.S. Cl. 424—99                                                  4 Claims

ABSTRACT OF THE DISCLOSURE

A gonadotropic hormone is purified by preparing a clear aqueous solution of the hormone containing between about 0.33 and about 0.40 mole fraction of a lower aliphatic alcohol, and having a pH between about 6 and 9, and containing between about 0.013 and about 0.016 mole fraction of a salt soluble in the alcohol such as an ammonium or amine salt of a lower aliphatic carboxylic acid, or a salt of a quaternary ammonium base, and then adding either a lower aliphatic carboxylic acid or an inorganic acid until the pH is between 3 and 6, simultaneously raising the alcohol concentration to between about 0.40 and about 0.52 mole fraction to selectively precipitate the gonadotropic hormone.

CROSS-REFERENCE TO RELATED APPLICATION

This application is a continuation-in-part of copending application Ser. No. 513,588 filed Dec. 13, 1965, now abandoned.

BACKGROUND OF THE INVENTION

This invention relates to a novel method for the purification of crude gonadotripins. More particularly, the invention concerns purification by precipitation of gonadotropins with an alcohol under controlled pH conditions.

By gonadotropins or gonadotropic hormones are meant hormones originally demonstrated in the anterior lobe of the pituitary gland and in urine. There were further found in serum and in the placenta and urine of pregnant women, and in the endometrium tissue and serum of pregnant mares. Gonadotropins are capable of stimulating ovaria and testes and bringing about in them morphological and functional changes. These substances are protein-like and more or less water-soluble. They differ according to their origin and chemical pre-treatment.

The following two groups of gonadotropins may be distinguished:

(a) Gonadotropins occurring in the pituitary anterior lobe. This group comprises the FSH (follicle stimulating hormone), the ICSH (interstitial cell stimulating hormone) and the prolactin or lactogenic hormone.

The extraction of pituitary glands and the separation of these hormones are described by Stanley Ellis in Endocrinology, 69, No. 3, September 1961, pp. 554–570. Pituitary glands of beef, sheep, or pig original are suc. Pituitary glands of beer, sheep, or pig origin are suc- $(NH_4)_2SO_4$ at pH 4.0, M/4 $(NH_4)_2SO_4$ at either pH 5.5 or 7.5 and finally with 60% ethanol at pH 9.8 to 10.

(b) Gonadortpoins isolated from raw materials other than the pituitary anterior lobe. This group chiefly comprises:

(1) Chorionic or placental human gonadotropin (HCG) which may be isolated from the placenta and urine of pregnant women. The preparation of HCG from urine is described by A. Albert in Proc. Staff Meet. Mayo Clinic, 30, pp. 552–556 (1955). A 24- or 48-hour urine specimen is adjusted to pH 4.5 with glacial acetic acid, and then 20 gms. kaolin are added with stirring. The urine is filtered and the kaolin bed recovered, washed with 2 liters water containing 1 cc. glacial acetic acid, and the bed eluated with 100 cc. 2 N $NH_4OH$; the eluate is collected, diluted with distilled water, adjusted to pH 5.5 with acetic acid, acetone is added, and the precipitate recovered. The preparation thus obtained can be used as the starting material for purification in accordance with the present invention.

(2) Gonadotropins from the urine of castrates and of women in their menopause (HMG). This hormone can be obtained by subjecting urine of menopausal women, 55–75 years of age, to a selective adsorption and desorption process on a technical adsorbent, such as kaolin and Amberlite XE–64 (a weakly acid ion exchanger) as e.g. described in Chem. Abstra. 53, 14203d (1959) or according to British Pat. 903,346, in which a zeolite is used as adsorbent. The obtained preparations can further be purified by the method of the present invention.

(3) Serum-gonadortropins occurring in the serum of pregnant mares (PMSG). This gonadotropic hormone can, e.g. be isolated from the blood of pregnant equine animals by extraction with acetone or acetic acid according to the method described in U.S. Pat. 2,238,866 (G. F. Cartland). The obtained preparation can further be purified by salting out the hormone followed by dialysis and gelfitration. The obtained end products can be used as starting materials for the present method.

The HMG to be recovered from human urine, which HMG contains FSH, is a therapeutically valuable preparation. The HCG, which can be prepared from the urine of pregnant women, is applied in therapy, and is currently also of importance for immunochemical determinations of this horomone, for instance in pregnancy tests and in diagnosing tumors secreting this hormone. The serum gonadotropin (PMSG), which can be prepared from the serum of pregnant mares and in which the FSH activity dominates, stimulates both the follicle maturation, the spermatogenesis and the interstitum of the ovarium and the testis, and is therefore also of therapeutical importance. It is clear that the purification of these hormones, to avoid undesired side-reactions, is of great importance both in therapy and in immunochemical determinations methods.

GENERAL DESCRIPTION OF THE INVENTION

The present invention relates to a method for the purification of preparations of gonadotropins which have been extracted or preliminarily purified by the methods of the prior art as outlined above, by means of fractionated precipitation with alcohol from an aqueous solution of the starting gonadotropin preparations.

From Acta Endocrinol. 47, 409 (1964) it is known that from a solution of HMG in a solution of about 4% ammonium acetate in water and an ethanol concentration of 60% (v./v.) various active fractions can be precipitated by a stepwise increase of the alcohol concentration to 85% (v./v.). With an ethanol concentration of 65–70% material with chiefly FSH activity may thus be precipitated and with a higher alcohol concentration active substance with chiefly ICSH activity.

In the Nethedlands patent application 6402059 there is disclosed that from a solution of a somewhat purified gonadotropic hormone preparation from human menopasual urine, in a 70% ethanol solution containing 10% ammonium acetate, the active substance can be precipitated with absolute ethanol containing 10% ammonium acetate.

Further, U.S. Pat. No. 2,238,868 discloses that serum gonadotropin can be precipitated from its solution in a mixture of water and alcohol at pH 6 by raising the alcohol concentration to 70%.

In accordance the the present invention, it has been found surprisingly that a much better purification is obtained by the novel process of the invention, whereby a preliminarily purified gonadotropic hormone which has been isolated from a source such as the pituitary gland anterior lobe, placenta and urine of pregnant women, menopausal urine and pregnant mare serum, followed by dissolving the crude hormone in an aqueous solution of ammonium acetate and ethanol and precipitation with additional ethanol, is subjected to the purification steps of the invention. These purification steps comprise preparing a clear aqueous solution of the preliminarily purified gonadotropic hormone containing between about 0.33 and about 0.40 mole fraction of a lower aliphatic alcohol, said solution having a pH between about 6 and about 9, and containing between about 0.013 and about 0.016 mole fraction of a salt soluble in said alcohol, such as the ammonium and amine salts of lower aliphatic carboxylic acids, salts of quaternary ammonium bases, and mixtures thereof. There is then added to the solution an acid, such as a lower aliphatic carboxylic acid or a monobasic inorganic acid, or mixtures thereof, until the measured pH has reached a value of between about 3 and about 6, and simultaneously the alcohol concentration is raised to between about 0.40 and about 0.52 mole fraction to selectively precipitate the gonadotropic hormone, the salt remaining in solution.

By mole fraction is meant the fraction $n_i/n$ which is the ratio of the number $n_i$ of molecules of the constituent $i$ of a homogeneous mixture—gaseous, liquid or solid—to the total number of molecules $n$.

As starting material for the process of the present invention, solutions of crude gonadotropin preparations are used from which the contaminations not soluble in an aqueous alcohol solution with a mole fraction of at least 0.33 have been removed by preliminary purification. This starting material may be prepared, for example, as follows: First the crude gonadotropin preparation is extracted with so much of an aqueous 10% ammonium acetate solution of a pH of between about 6 and 9 until a solution of about 0.25–2% protein is formed, the temperature being kept low, for instance between +4° and −3° C. After a sufficiently long extraction period an alcohol is added to the solution until its mole fraction has reached a value of 0.33. The precipitate formed is removed after standing overnight at a temperature between about +4° and −7° C. The clear mother liquor is the starting solution for the present fractionation.

The salt used in the process of the invention has the property that it is soluble in the applied alcohol solutions and exerts its dissolving action in the system applied, together with the acid used, which acts as a solvent and a proton donor but not as an ionogenic substance. The latter property prevents the desired hormone from being precipitated too rapily, with the attendant danger of simultaneously precipitating the impurities, and this is a novel feature of the invention. Moreover, the salt remains in solution at the end of the process.

In general, any salt may be applied which is soluble in the liquid system in which the precipitation of the active substance takes place, such as the ammonium salts of the organic acids mentioned hereafter, which may be used in the precipitation, further the salts of these acids and an amine, for instance an aromatic amine such as aniline, a heterocyclic amine such as pyridine, pyridazine, pyrazine, pyrrol, imidazol and aliphatic amines, such as methylamine, ethylamine, dimethyl and diethylamine, and derivatives of these amines. Also the salts of quaternary ammonium bases, such as trihydroxymethylaminomethane and ethylene diamine tetra-acetic acid.

Preferably ammonium salts are used, especially of the organic acids which may be used in the precipitation, for instance, acetic acid. The function of these salts in the purification according to the invention consists in that they have a general dissolving action in the system applied, which is of essential importance in the present process. Thus, according to the invention, an acid or a mixture of acids is added to the solution of the gonadotropin at low temperature as conventional in fractionated precipitation until the pH-meter indicates a value of between about 3 and 6, adding simultaneously an alcohol. After a few hours to a few days standing, the formed precipitate containing the greater part of the biologically active substance is isolated, preferably by centrifuging, next washed with a volatile organic liquid, such as ethanol, methanol and ether, and dried.

Suitable acids include a water-soluble organic acid and a monobasic inorganic acid, such as hydrochloric acid. As examples of suitable organic acids there are mentioned lower aliphatic carboxylic acids, such as formic acid, acetic acid, propionic acid, butyric acid, malonic acid and succinic acid. Halogenated aliphatic acids, also, such as mono- and trichloro acetic acid, and acids substituted by other groups, such as hydroxyl, keto or amino groups, for example, citric acid, lactic acid, tartaric acid, glutamic acid and aspartic acid, and further unsaturated carboxylic acids are usable.

Preferably an organic acid is used, separately or in combination with an inorganic acid, causing a more selective precipitation of the active substance and the contaminations to remain in solution. This especially applies if the mole fraction of hydrochloric acid has a value of about 0.009 and that of acetic acid of about 0.035.

In the present process, a lower aliphatic alcohol, such as methanol, ethanol and propanol, which under the conditions of the purification are practically completely water-miscible, is used.

In the recoverey of these hormones in purified condition the alcohol plays the part of a precipitation agent, but it does not only precipitate the active substances, but also the attendant contaminations, so that it is clear that the desired purification cannot be brought about by precipiation with alcohol only.

It has been found that with HCG preparations it is best to start from clear solutions with a mole fraction of ethanol of about 0.4. With HMG preparations a lower mole fraction, i.e. 0.33, raising it to about 0.4, is preferably used to start from, when practically all the FSH containing substance is precipitated.

For the preparations obtained by the present process the biological activities were determined in the following manner: the HCG or ICSH was assayed against the international standard for chorionic gonadotropin in the seminal vesicle test analogous to the prostate test according to J. A. Loraine, see J. Endocrinol. 6, 319 (1950), differing in that to the solutions to be assayed albumin is also added in a quantity by weight of about 0.1% to stabilize the hormone. The seminal vesicle test is specific for the ICSH. The HMG was assayed against the international reference preparation (IRP) HMG 24 in the so-called augmentation test according to S. L. Steelman and F. M. Pohley, in which the activity is expressed in mg. equivalent IRP (see Endocrinology 53, 604 (1953). The augmentation test is specific for the FSH.

With the present process concentrations can be prepared with a potency of 1500 to 10000 I.U. per mg., dependent on the activity of the starting material used starting for example from HCG preparations with a biological activity of 500 to 3000 I.U. per mg. to be measured in accordance with the seminal vesicle test. In the same manner it is possible for instance to concentrate HMG preparations with an FSH activity of some tens of mg. equivalent IRP per mg. to a potency of many hundreds of mg. equivalents IRP per mg.

The yields of active material, calculated on the basis of the various tests, may amount to from 60% to even more than 90% of the original number of units. The method according to the invention provides a simple and efficient manner for the purification of crude gonadotropins. In addition contaminations are removed by this process which might be a disturbing factor in further purification. Thus the present products may be processed further into preparations of an unparalleled high purity in an excellent manner.

The very pure gonadotropic hormone preparations made possible by the present invention are of great scientific and therapeutic significance. Thus, these hormones could heretofore be prepared only from very limited natural sources. They may be used directly as medicaments when certain deficiencies appear, and may be administered in purest form to prevent side reactions. Finally, the hormone preparations are suitable as antigens to prepare homologous antiserum for diagnostic purposes.

DESCRIPTION OF THE PREFERRED EMBODIMENTS

The following examples serve to illustrate the practice of the invention, but are not to be regarded as limiting:

EXAMPLE 1

Pretreatment 10 gm. of an HCG concentrate with a biological activity of 2500 I.U. per mg. prepared as described in Proc. Staff. Meet. Mayo Clin. 30, 552 (1955), were suspended in 2 liters of a 10% ammonium acetate solution in water of pH 6.5, maintaining the temperature at $-1°$ C. After an extraction period of 15 hours 4162 ml. of 96% ethanol were added to the mixture to reach the respective mole fractions of ethanol 0.398, water 0.588 and ammonium acetate 0.014. After standing for 24 hours at $-6°$ C. the formed practically inactive precipitate containing only 158 I.U. per mg., was removed by centrifuging at $5000 \times g$.

Purification process

To the clear mother liquor were next added 500 ml. of glacial acetic acid and 4.31 liters of 96% ethanol, after which a pH value was measured of 5.6 to obtain the following values for the respective mole fractions: water 0.437, ammonium acetate 0.009, ethanol 0.52 and acetic acid 0.03. After standing for 24 hours at $-6°$ C. the formed active precipitate was isolated by centrifuging at $5000 \times g$. Next it was washed with ethanol and ether, and finally dried at reduced pressure. The biological activity of this preparation (4.215 gm.) amounted to 5400 I.U. per mg. in the seminal vesicle test, the yield of units compared with the input amounting to 91%.

By raising the mole fraction of ethanol a further 15% of the originally charged weight of very low active material (about 50 I.U. per mg.) was isolated.

EXAMPLE 2

Pretreatment

Of an HCG preparation with an activity of 1740 I.U. per mg. 9673 mg. obtained as described in Netherlands patent application No. 6402059 mentioned above, were suspended in 2000 ml. of a 10% ammonium acetate solution in water (pH 7.9), maintaining the temperature at $2°$ C. After standing for 48 hours 5385 ml. of 96% ethanol were added to obtain a mole fraction of 0.432 of ethanol, 0.56 of water and 0.013 of ammonium acetate. After standing for 15 hours at $-5°$ C. the formed precipitate was isolated by centrifuging, and next washed and dried to obtain 4945 mg. of substance with an actvity of 450 I.U. per mg.

Purification process

Next there were added to the clear mother liquor at the same time: 515 ml. of glacial acetic acid, 1652 ml. of absolute ethanol, 214 ml. of water, 82 gm. of hydrochloric acid and 320 mg. of sodium hydroxide. In this mixture the pH-meter showed a value of 3.85 and the mole fractions of the added components were: water 0.49, ammonium acetate 0.01, ethanol 0.46, acetic acid 0.035, hydrochloric acid 0.009 and NaOH $3 \times 10^{-5}$. The temperature was maintained at $-5°$ C. After standing for 48 hours at this temperature the formed precipitate was isolated in the conventional manner, washed and dried to obtain 1019 mg. of substance with a biological activity of 8600 I.U. per gm., which is 60% of the number of units present in the clear hormone solution.

By further addition of 10 liters of 70% (v./v.) ethanol to the mother liquor the following mole fractions were obtained: water 0.54, ammonium acetate 0.005, ethanol 0.44, acetic acid 0.017, hydrochloric acid 0.004 and NaOH $1.5 \times 10^{-5}$. After standing for 2.5 days at $-5°$ C. another active fraction of 176 mg. of about 4500 I.U. per mg. could be isolated. By raising the alcohol content still further a last active fraction of 293 mg. with an activity of 2700 I.U. per mg. could finally be recovered.

EXAMPLE 3

Pretreatment

Of an HMG preparation with an FSH activity per mg. corresponding with 50 mg. of IRP in the rat augmentation test and an ICSH activity per mg. corresponding with 20 I.U. of HCG in the seminal vesicle test 7.25 gm. (cf. Chemical Abstracts, 53, 14203 (1959)) were extracted for 12 hours in 1450 ml. of a 10% ammonium acetate solution in water of a pH of 7.5 at $-1°$ C. Next 2175 ml. of 96% ethanol were added dropwise to the suspension, after which the following mole fractions were reached: ethanol 0.33, water 0.65 and ammonium acetate 0.02. After standing overnight at $-1°$ C. the formed precipitate was removed together with the insoluble residue that had remained behind in the extraction. The separated material weighed 1.040 gm. and had an activity in the augmentation test of less than 2.2 mg. equivalent IRP per mg. To the resulting clear mother liquor another 494 ml. of absolute ethanol were added till the following mole fractions were reached: ethanol 0.376, water 0.609, and ammonium acetate 0.015. The precipitate formed after standing overnight was washed after isolation, dried and tested for its activity. Obtained 700 mg. with an activity in the augmentation test of 10 mg. equivalent IRP per mg. This preparation showed no activity in the seminal vesicle test. In units this fraction amounted to 1.9% only of the input.

Purification process

Finally hydrochloric acid, acetic acid and ethanol were added to the clear solution till the following mole fractions were reached: hydrochloric acid 0.004, acetic acid 0.03 and ethanol 0.40. The mole fractions of the water and the ammonium acetate were 0.553 and 0.013 respectively. After standing overnight at $-1°$ C. the formed precipitate was isolated in the manner described above, washed and dried to obtain 650 mg. of substance with an activity in the augmentation test of 440 mg. equivalent IRP per mg. The activity per mg. in the seminal vesicle test corresponded with 2 I.U. HCG. Yield on the basis of the augmentation test 79%. By further addition of ethanol to the mother liquor to a mole fraction of 0.55 another precipitate was obtained with an ICSH activity per mg. corresponding with 40 I.U. HCG in the seminal vesicle test and with a relatively low FSH activity (10–20 mg. equivalent IRP per mg.).

What is claimed is:

1. Process for the further purification of a preliminarily purified gonadotropic hormone which has been preliminarily prepared from a source selected from the group consisting of placenta of pregnant woman, urine of pregnant woman, menopausal urine, and pregnant mare serum, by dissolving the hormone in an aqueous solution of ammonium acetate having a concentration up to about 10% weight/volume and added ethanol and precipitating the hormone by adding ethanol up to about 85% by volume to obtain a preliminarily purified hormone, and further purifying the hormone by a method comprising:

(a) extracting said preliminarily purified gonadotropic hormone with an equeous liquid medium containing between about 0.33 and about 0.40 mole fraction of a lower aliphatic alcohol, said medium having a pH between about 6 and about 9, and containing between about 0.013 and about 0.016 mole fraction of an ammonium salt of a lower aliphatic carboxylic acid soluble in said alcoholic medium; and (b) adding to the extract obtained in (a) an acid selected from the group consisting of a lower aliphatic carboxylic acid, hydrochloric acid, and mixtures thereof, until the measured pH has reached a value between about 3 and about 6 and simultaneously raising the alcohol concentration to between about 0.40 and about 0.52 mole fraction to selectively precipitate the gonadotropic hormone, the salt remaining in solution.

2. The process of claim 1 in which in step (a) the preliminarily purified gonadotropic hormone is human chorionic gonadotropic hormone, and the aqueous solution contains about 0.40 mole fraction of ethanol.

3. The process of claim 1 in which the acid is a lower aliphatic carboxylic acid.

4. The process of claim 1 in which the starting material is a human chorionic gonadotropin and the acid addition is a mixture of hydrochloric acid and acetic acid, the mole fraction of the mixture being adjusted to about 0.009 and 0.035 respectively.

References Cited
UNITED STATES PATENTS

| | | | |
|---|---|---|---|
| 2,238,868 | 4/1947 | Cartland | 424—101 |
| 2,603,585 | 7/1952 | Ciaesson et al. | 424—100 |
| 2,799,621 | 7/1957 | Steelman | 260—112.5 |

OTHER REFERENCES

Van Hell et al., Acta. Endocrinologica, vol 47, pp. 409–418 (1964).

SAM ROSEN, Primary Examiner

V. D. TURNER, Assistant Examiner

U.S. Cl. X.R.

424—100, 105